United States Patent [19]

Hawk

[11] 4,416,106
[45] Nov. 22, 1983

[54] METHOD AND APPARATUS FOR REMOVAL OF AQUATIC PLANT GROWTH

[76] Inventor: James L. Hawk, 22435 SE. 288th, Kent, Wash. 98031

[21] Appl. No.: 366,478

[22] Filed: Apr. 8, 1982

[51] Int. Cl.³ ............................................ A01D 44/00
[52] U.S. Cl. .............................................. 56/8; 56/9; 56/DIG. 2
[58] Field of Search ........................... 56/8, 9, DIG. 2

[56] References Cited

U.S. PATENT DOCUMENTS

| | | | |
|---|---|---|---|
| 2,317,367 | 4/1943 | Foerster | 56/8 |
| 3,238,708 | 3/1966 | Zickefoose | 56/9 |
| 3,407,577 | 10/1968 | Fiske | 56/8 |
| 3,477,213 | 11/1969 | Just et al. | 56/9 |
| 3,751,887 | 8/1973 | den Herder | 56/9 |
| 3,765,156 | 10/1973 | Porter | 56/8 |
| 4,070,978 | 1/1978 | Virgilio | 56/8 |
| 4,205,507 | 6/1980 | McClure | 56/8 |
| 4,248,033 | 2/1981 | Bryant | 56/8 |
| 4,328,658 | 5/1982 | Desrosiers et al. | 56/8 |

*Primary Examiner*—Paul J. Hirsch
*Attorney, Agent, or Firm*—Christensen, O'Connor, Johnson & Kindness

[57] ABSTRACT

A method of removing aquatic plants growing from the bed of a lake or other body of water includes the steps of moving a horizontally oriented bar through the plants beneath the surface of the water, permitting the plant stalks to wrap themselves around the bar. As the bar continues to move, the plant stalks are pulled and either broken at a point between the bar and the roots or are pulled out of the lake bottom by the roots. Once the plants have been broken off or pulled out of the bottom, the bar is moved to a desired position and the plant stalks severed to free them from the bar. An apparatus for carrying out the method provides a plant-engaging bar mounted on the free end of a boom pivotally mounted on a hull floating in the water. The boom can be lowered to place the bar beneath the surface of the water and the hull has a propulsion system to move it through the water, thereby moving the bar through the plant beds. A blade, preferably having a double cutting edge, is mounted on the boom adjacent the horizontal bar so that the plants wrap themselves about the bar and blade simultaneously. When the bar is brought to the desired location for freeing the plants, the blade is moved in relation to the bar and the sharpened edges of the blade sever the plant stalks, cutting the loops of the stalks around the bar and thereby freeing the plants from the bar. In one embodiment of the invention, the blade is arranged to move reciprocally upwardly and downwardly severing the plants in a chopping motion. In another embodiment of the invention, the blade is arranged to rotate in propeller-like fashion, thereby severing the plants. In the preferred embodiment, a second bar is horizontally oriented and mounted below the first bar, the boom being lowered sufficiently to drag the second bar through the lake bottom to disturb the root systems of the plants and make them easier to pull out by the force exerted on them by the first bar.

14 Claims, 6 Drawing Figures

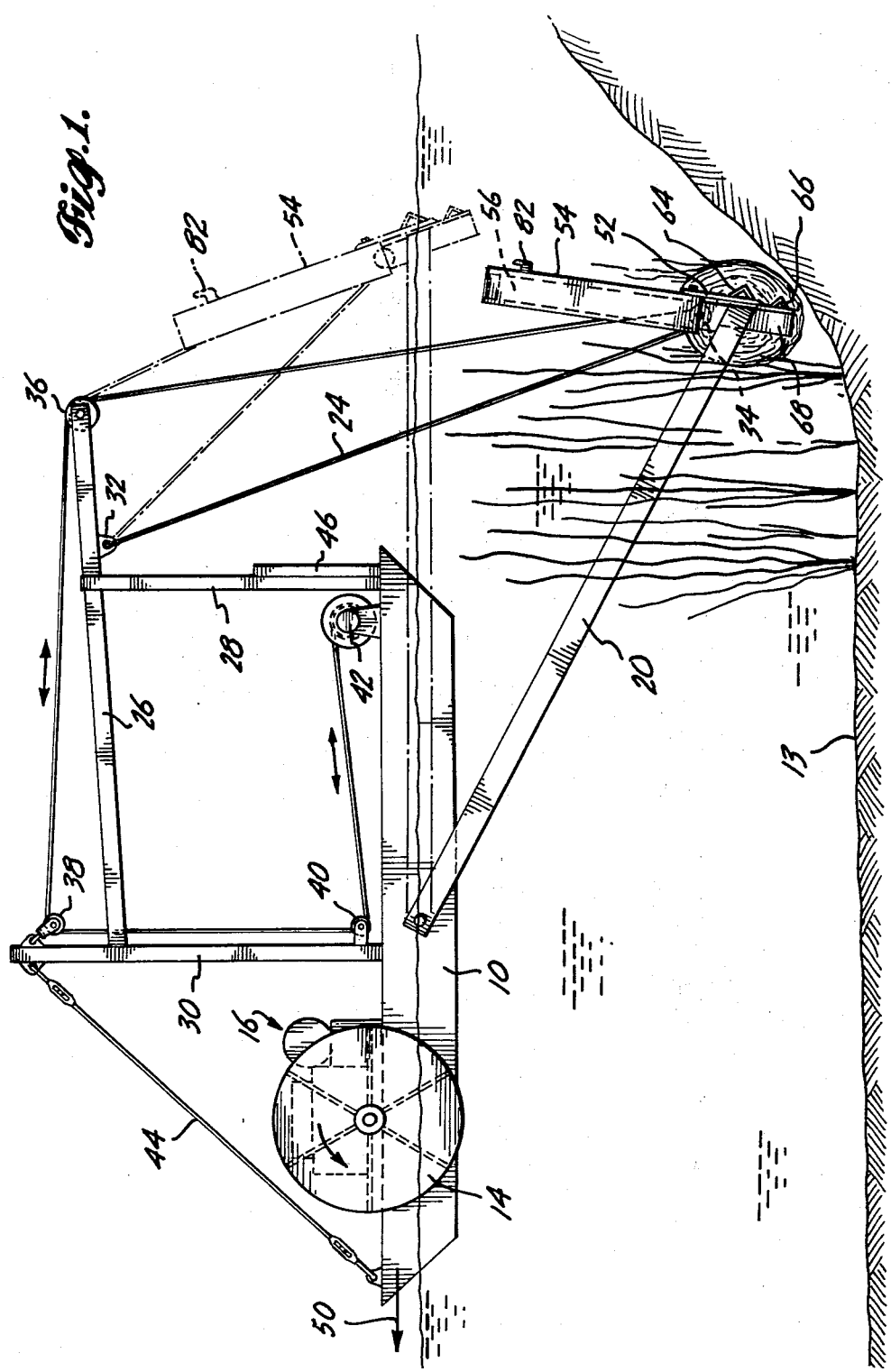

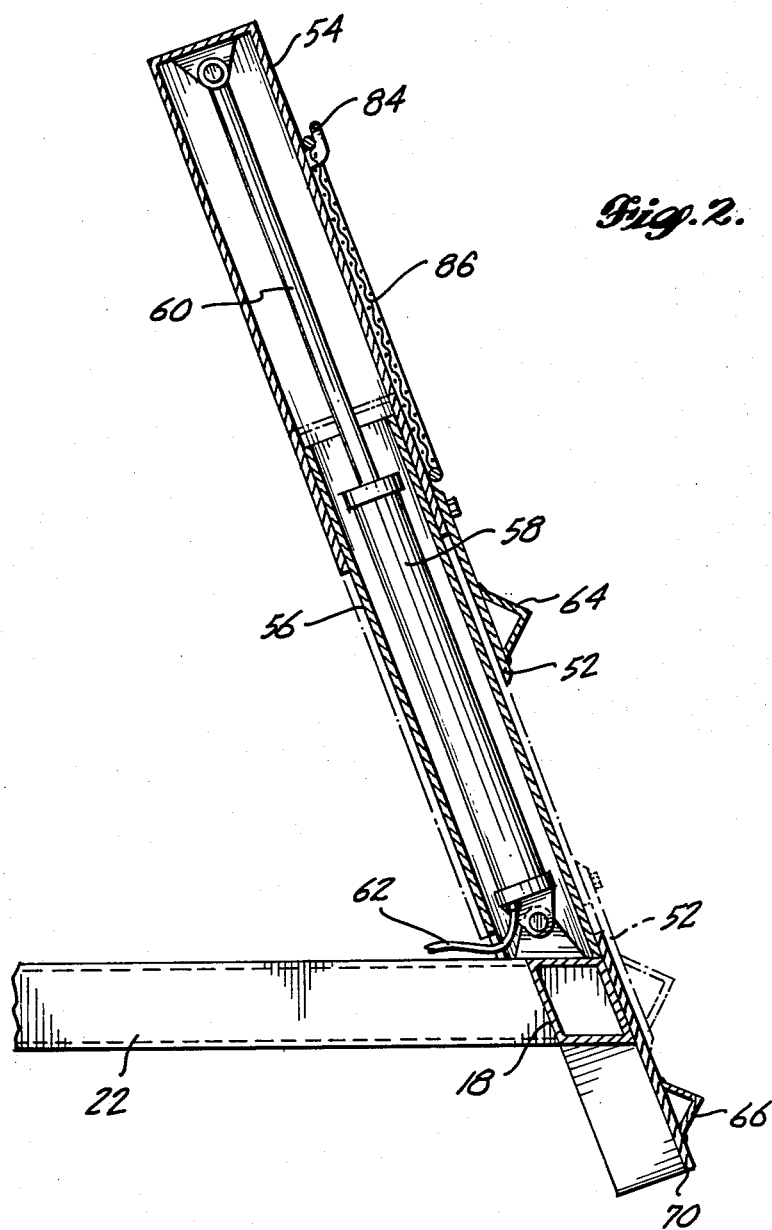

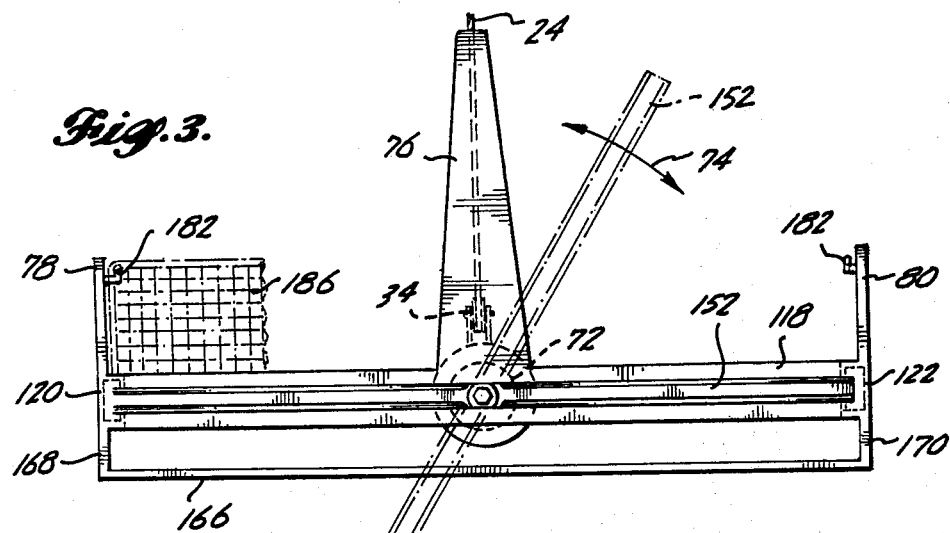
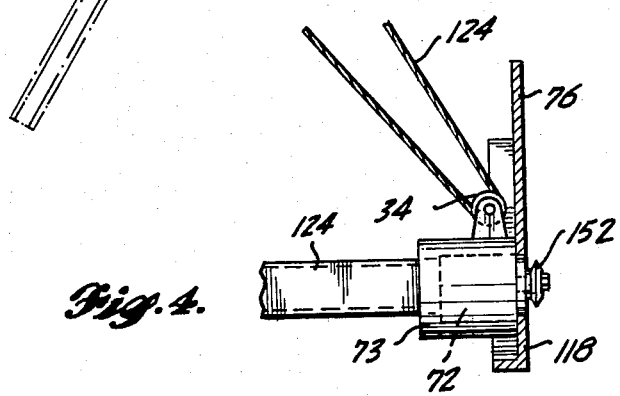
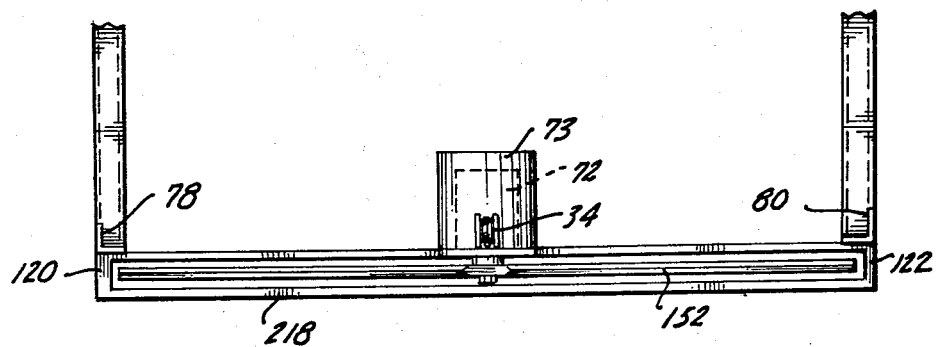

METHOD AND APPARATUS FOR REMOVAL OF AQUATIC PLANT GROWTH

BACKGROUND OF THE INVENTION

This invention relates to a method and apparatus for removing aquatic plant growth and more particularly relates to a method and apparatus for removing noxious weeds growing from the bottom of lakes and ponds.

For several years, there has been an alarming increase in the presence of certain aquatic weeds in freshwater lakes. The most dramatic increase has been in the growth of Eurasian milfoil, which rapidly spreads once it is introduced into a lake, clogging the lake and making it unsuitable for recreational use. In the case of smaller lakes, the milfoil can actually choke and destroy the lake. Several herbicides have been found useful in combatting Eurasian milfoil and other aquatic weeds, however, certain of them are unsuitable for use in recreation lakes because they also have a harmful effect on fish and other aquatic life. Certain of them have even been charged with being carcinogens.

It is much more desirable to remove the weeds without the use of herbicides or other chemicals. However, up until now, the apparatus used to remove such weeds has generally operated in the manner of a mower which cuts the weeds off near their base. An example of such device is in U.S. Pat. No. 3,238,708, issued to Zickefoose. Use of apparatus such as that disclosed by Zickefoose leaves the root system of the weed intact so that the weed continues to grow, making its removal by the Zickefoose apparatus a solution of short duration, which must be repeated several times during the growing season.

It is therefore an object of this invention to provide a method and apparatus for removing aquatic growth such that the effects of such removal will be relatively long-lasting, for example, over an entire growing season.

It is a further object of this invention to provide for the removal of not only the growing portions of the weeds, but also the root systems of the weeds so that the effects of removal are longer-lasting than in previous methods.

It is another object of this invention to provide for such removal of the weeds and their root systems in a quick and efficient manner and in a manner that permits the use of the weeds upon removal as fertilizer or in some other manner.

SUMMARY OF THE INVENTION

In accordance with the above-stated objects, a method and apparatus for aquatic plant removal is provided. The method includes the steps of moving a substantially horizontally oriented elongated bar through the plant beds near the bottom of the lake so that the bar contacts the stalks of the plants, encouraging the plants to wrap themselves around the bar as it is drawn through the plant bed. Once the plant stalks have wrapped themselves around the bar, the bar is continued to be drawn through the bed tearing the plant stalks out and taking along with them a substantial portion of the root systems of the plants. The bar is then raised out of the water and the plants removed therefrom. Removal of the plants from the bar can occur either in the water or over land, and if it occurs in the water, a further step of the method includes the collection and movement of the removed plants to the shore for their ultimate disposal. In the preferred embodiment, the method includes the step of dragging a second horizontally oriented bar, positioned below the first bar, through the lake bottom itself, thereby disrupting the root systems of the plants further and loosening the plants so that they can be more easily dislodged once they have wrapped themselves around the first bar.

An apparatus for carrying out the above-described method of aquatic plant removal includes a barge or other floating hull means with a propulsion system provided to propel the barge in the forward and reverse directions. A boom is pivotally mounted at its first end on the barge in such a manner that the boom is capable of being raised and lowered so that the second free end of the boom can be positioned beneath the surface of the water. At the free end of the boom an elongate plant-engaging means is attached in a substantially horizontal orientation and the boom and plant-engaging means cooperate so that the plant-engaging means can be moved through a plant bed beneath the water surface by moving the barge in a first direction. As the plant-engaging means is dragged through the plant bed, the plant stalks wrap themselves about the plant-engaging means and the plants are pushed until the stalks break free or the roots are dislodged fromm the lake bottom. Once a substantial number of plants are collected on the plant-engaging means, it is necessary to provide a system for removing the wrapped plant stalks from the plant-engaging means. In one embodiment of the present invention, the plant-engaging means comprises a stationary bar and a reciprocating double-edged blade which cooperates with the bar to cut the weeds. The blade is kept in a first position closely adjacent the stationary bar when the plant-engaging means is being moved through the plant bed so that the plants are wrapped about both the stationary bar and the blade. When it is desired to cut the wrapped plant stalks free of the plant-engaging means, the double-edged blade is moved to a second position spaced from the bar to cut the plants stalks wrapped around the bar and the blade. As the double-edged blade moves back into its first position, it again cooperates with the bar to cut any plants that it contacts. Once the plant stalks are cut, they are able to fall freely away from the plant-engaging means. Preferably, a rooting bar is attached to the boom in a horizontal orientation below the plant-engaging means. The rooting bar drags along the lake bottom as the plant-engaging means is moved through the plant bed, disturbing the plant roots as it moves, making it easier for the plants to be uprooted by the pull of the plant-engaging means.

In another embodiment of the invention, the blade is rotatably mounted relative to the stationary bar and moves about the pivot point cooperating with the bar and an upright anvil portion fixed on the boom. Detent means are provided to maintain the blade in a horizontal orientation while moving the plant-engaging means through a plant bed allowing the plant stalks to wrap themselves around the blade and stationary bar. When it is desired to free the weeds from the plant-engaging means, the blade is rotated about the pivot point and the plant stalks are cut by the cutting edge of the blade in cooperation with the stationary bar and the upright anvil portion, thereby freeing the plants and permitting them to drop from the plant-engaging means either into the water or on shore, depending on the location of the plant removal apparatus at the time the plants are cut free.

BRIEF DESCRIPTION OF THE DRAWINGS

The above-noted features and advantages of the present invention will be better understood by those of ordinary skill in the art and others upon reading the ensuing specification taken in conjunction with the appended drawings wherein:

FIG. 1 is a side elevation view of one embodiment of an aquatic plant removal apparatus made in accordance with the principles of the present invention;

FIG. 2 is a side elevational view of one embodiment of a plant-engaging means used in the plant removal apparatus of FIG. 1;

FIG. 3 is a front elevational view of another embodiment of a plant-engaging means for use with the plant removal apparatus of FIG. 1;

FIG. 4 is a side elevational view of a portion of the plant-engaging means shown in FIG. 3;

FIG. 5 is a plan view of a modification of the plant-engaging means shown in FIG. 3.

DETAILED DESCRIPTION OF THE PREFERRED EMBODIMENT

Figure 6:
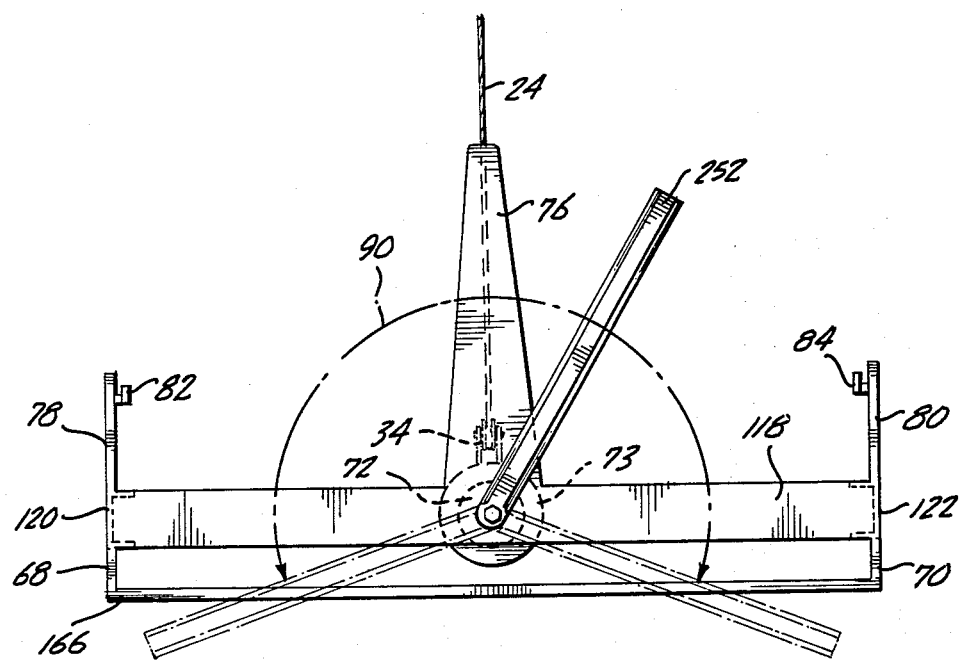
FIG. 6 is a front elevational view of another embodiment of a plant-engaging means for use with the plant removal apparatus of FIG. 1.

Referring to FIG. 1, one embodiment of an apparatus for removing aquatic plant growth made in accordance with the principles of the present invention includes a barge 10 having a propulsion unit mounted thereon to propel the barge in the forward and aft directions. The barge 10 has a flat-bottomed hull and the propulsion is by means of a pair of paddle wheels 14 (only one of which is visible in the drawings) placed on opposite sides of the barge 10. The paddle wheels 14 are driven by hydraulic motors and a diesel engine and pump unit 16 provides pressurized hydraulic fluid to the hydraulic motors to turn the paddle wheels and thereby propel the boat. The particular hull and propulsion means used is not critical to the invention, however, it has been found preferable to use a flat-bottomed or other shallow-draft hull in order that the weed removal apparatus can operate in shallow water depths near shore.

The weeds 12 to be removed grow from the bottom 13 of a lake or other body of water and are engaged by an elongate weed-engaging bar 18 mounted substantially horizontally between the ends of two elongage boom members 20 and 22. The boom members 20 and 22 are each pivotally attached at their respective first ends to the barge 10. The weed-engaging bar 18 is mounted between the boom members at their respective second ends extending forward of the barge. In the illustrated embodiment, the weed-engaging bar 18 comprises a box channel member as can be seen in the partial section view of FIG. 2. The boom members and weed-engaging bar are suspended by cable 24 from an upper support beam 26 that lies along the fore-aft axis of the barge 10 spaced from the deck of the barge and in turn supported by a forward vertical support post 28 and an aft vertical support post 30. The cable 24 is affixed at a first end to an eye 32 mounted in the upper support beam 26. The cable passes around a first pulley 34 mounted on the weed-engaging bar 18 at approximately its midpoint. The cable 24 passes over a second pulley 36 rotatably mounted on the forward end of the upper support beam 26. The cable then passes over a third pulley 38 attached to the aft vertical support post 30 near its upper end. The cable 24 then passes around a fourth pulley 40 mounted at the lower end of the aft vertical support post 30 near the deck of the barge 10. The cable is then connected to the reel of a power winch 42 and movement of the reel of the power winch takes up and lets out the cable 24 which raises and lowers the boom members 20 and 22 and the weed-engaging bar 18. When in use, the boom is generally lowered to position the bar 18 below the surface of the water so that it can engage the weeds beneath the water and have the weeds wrap around the bar 18. When the weed removal apparatus is in transit from one location to another, the boom members 20 and 22 are generally kept parallel to the fore/aft dimension of the barge as shown in phantom lines of FIG. 1. A guy wire 44 is attached at a first end thereof to the upper end of the aft vertical support post 30 and at its second end to the deck of the barge in a conventional manner to provide support for the aft vertical support post. Also, a conventional support structure 46 is mounted to the barge deck and to the forward vertical support post 28 in a conventional manner to provide structural integrity to the forward vertical support post 28.

As was discussed earlier, in operation, the weed-engaging bar 18 is generally located below the surface of the water in contact with the stalks of the weeds growing from the bottom of the lake or other body of water upwardly toward the surface. Generally, the barge 10 will be propelled in an aft direction as shown by the arrow 50 so that the weed-engaging bar 18 is dragged rearwardly through the weed bed permitting the weeds to wrap themselves around the bar 18. As the weeds wrap themselves around the bar 18 the motion of the bar in the aft direction pulls the weeds, breaking some of the stalks and uprooting others from the lake bottom. Once a mass of weeds has been wrapped around the weed-engaging bar 18 and pulled from their growing location, it is then necessary to free the weeds from the bar 18. A double-edged elongate blade member 52 is positioned so that it overlies the forward surface of the weed-engaging bar 18 and is coextensive therewith during the weed removal operation while the weed-engaging bar is being dragged through the weed bed. Therefore, the weeds actually wrap themselves around both the weed-engaging bar 18 and the elongate blade 52. The blade 52 is mounted at each end thereof to the lower end of an outer box tube 54 which in turn overlies a second inner box tube 56 of smaller exterior dimensins than the outer box tube 54. The inner box tubes are affixed to the ends of their associated boom members 20 and 22 and extend upwardly from the boom members. A hydraulic cylinder 58 is mounted inside each of the inner box tubes 56 and affixed to the respective boom members 20 and 22. Each hydraulic cylinder 58 has a piston mounted therein with an extendable rod 60 affixed to the piston and extending from a second, upper end of the hydraulic cylinder 58. The end of the rod 60, which extends from the cylinder 58, is affixed to the interior of the upper wall of the outer box tube 54.

Referring to FIG. 2, the outer box tube 54 is shown in phantom line in its at-rest position and in that position, the rod 60 is contained substantially completely within the cylinder 58 and the blade 52 overlies the weed-engaging bar 18. A hydraulic line 62 carries hydraulic fluid to the cylinder 58 from a source of pressurized hydraulic fluid on the barge. In the preferred embodiment, the source of hydraulic fluid for the cylinder 58 is the same diesel engine and pump arrangement 16 that provides hydraulic fluid to propel the barge by means of the paddle wheels. When it is desired to cut the weeds free from the weed-engaging bar 18, the pressurized fluid is channeled to each of the hydraulic cylinders 58 thereby extending the rods 60 from their respective cylinders. As shown in the solid line drawing of FIG. 2, as the rod 60 extends from the cylinder 58 it carries with it the outer box tube 54 and thereby moves the blade 52 upwardly. The upper edge of the blade 52 thereby shears the weed loops surrounding the bar and blade permitting the weeds to fall free from the bar 18. The hydraulic pressure within the cylinder 58 can then be released, permitting the rods 60 to move back into their respective cylinders and permitting the outer box tube 54 to move downwardly bringing the blade 52 back into overlying relationship with the weed-engaging bar 18. As the blade 52 moves downwardly as viewed in FIG. 2, the lower edge of the blade 52 will engage and cut any remaining weeds to more completely sever all remaining weed loops thereby permitting substantially all of the weeds to fall free from the bar. The weed-engaging bar 18 is then ready to be dragged through the weed bed again to collect more weeds and uproot them from the lake bottom. A reinforcing channel member 64 is mounted on the forward surface of the blade 52 with the apex of the channel member pointed forwardly. The channel member 64 simply provides reinforcing to the blade to prevent the blade from being bent as the weed removal apparatus moves through the water, should the blade strike any floating debris, such as logs or pieces of wood in the water.

The most effective and long lasting weed removal occurs when the weeds are completely uprooted from their growing location in the lake bottom. Therefore, it has been found desirable to suspend a dragging bar 66 below the weed-engaging bar 18 and to actually lower the boom members 20 and 22 sufficiently so that the dragging bar 66 engages and drags through the lake bottom disturbing the weed root systems and permitting the weeds to be completely uprooted once they have wrapped themselves about the weed-engaging bar 18. The dragging bar 66 extends substantially horizontally and parallel to the weed-engaging bar 18 and is attached at its ends to respective channel members 68 and 70 extending downwardly from the forward ends of the boom members 20 and 22.

Preferably, when the weeds are cut from the weed-engaging bar 18, the barge is run up close to shore so that the weed-engaging 18 bar overlies the shore and the weeds drop to the dry land where they can be gathered and removed in a conventional manner. However, if the removal apparatus is working far from shore, and it becomes impractical to make several trips in to shore to release the weeds from the weed-engaging bar, it is then possible to simply activate the blade 52 while the boom members are under water and allow the weeds to float to the surface. Alternatively, the boom can be raised and the blade activated allowing the weeds to drop into the water where they will float. A pusher screen 86 is supported from a pair of pusher hooks 82 and 84 affixed to the forward walls of the outer box tube 54. After several passes of the weed-engaging bar through the weed bed and subsequent removal of the weeds from the weed-engaging bar into the water, the barge is moved forwardly through the water utilizing the pusher screen 86 to push the weeds to the shore and up onto the dry land where they can be removed by conventional means. While the pusher is described as a screen 86, any planar member will do as long as it has openings therein for the water to flow through as the barge moves forwardly so that the resistance to movement is not too great and also so that the weeds are not pushed out of the way by the pressure wave ahead of the pusher means. A plate with holes drilled through it could be used as a pusher. Since the weed pieces that will be floating in the water will be relatively large, a large mesh screen can be utilized without any meaningful loss of weed pieces through the openings in the screen.

Referring now to FIG. 3, another embodiment of a weed removal apparatus made in accordance with the principles of the present invention is shown, particularly the weed-engaging and removing means. In the embodiment shown in FIG. 3, the blade 152 is rotatably mounted at approximately its centerpoint on a hydraulic motor 72. The hydraulic motor 72 is mounted in a housing 73 affixed to the weed-engaging bar 118 at its midpoint. The hydraulic motor 72 is connected to the source of pressurized hydraulic fluid described above. The weed-engaging bar 118 is mounted substantially horizontally between the boom members 120 and 122 and is dragged through the weed bed in the same manner as described above. While dragging through the weed bed the blade 152 lies substantially horizontally coextensive with the bar 118. When the weeds are to be removed from the weed-engaging bar 118 the hydraulic motor 72 is energized to rotate the blade 152 as shown by arrow 74, thereby cutting the weeds by cooperation of the edges of the blade 152 with the blade-engaging bar 118. To further enhance the cutting effect, a shearing plate 76 is mounted approximately at the midpoint of the weed-engaging bar 118 and extends upwardly a distance approximately equal to the distance from the pivot point of the blade 152 to the ends of the blade 152. The cutting edges of the blade 152 cooperate with the shearing plate 76 to enhance cutting of the weed stalks. A drag bar 166 is mounted below the weed-engaging bar 118 substantially parallel thereto. The drag bar 166 is affixed at its ends to, respectively, channel members 168 and 170 extending downwardly from the boom members 120 and 122. A first pusher support 78 extends upwardly from the boom member 120 and a similar second pusher support 80 extends upwardly from the boom member 122. The pusher supports have hooks 182 and 184, respectively, mounted thereon that are adapted to receive a pusher screen member 186 that is placed on the hooks 182 and 184 and utilized to push the weeds cut from the weed-engaging bar 118 through the water to shore.

Referring now to FIG. 4, a portion of the blade assembly shown in FIG. 2 is again shown in side elevation. The hydraulic motor 72 has a hub mounted on its forward end to which the blade 152 is attached. The cable 24 for raising and lowering the boom passes over a pulley 134 rotatably mounted on the hydraulic motor 72. The shearing plate 76 is mounted ahead of the pulley 126 and preferably has a hole formed therethrough through which the shaft of the hydraulic motor 72 can pass.

FIG. 5 illustrates an alternative embodiment to the blade assembly of FIG. 3. Referring to FIG. 5, the blade 152 lies within a slot formed in a weed-engaging bar 218. As the weeds wrap themselves about the weed-engaging bar 218, they will surround the blade 152. To remove the weeds from the weed-engaging bar 218, the blade 152 is rotated and the blade cooperates with the portions of the weed-engaging bar 218 lying forward and aft of the blade to shear the weed stalks.

Referring now to FIG. 6, another alternative blade arrangement is pictured. The general configuration of the weed removal apparatus shown in FIG. 6 is the same as that described with relation to FIG. 3, however, the blade 252 is approximately one-half the length of the blade 152. It has been found that, in certain situations, particularly when the shoreline has a bulkhead or other barrier, it is difficult to raise the boom members high enough to permit free rotation of the blade 152 without having the lower end of the blade strike the ground or bulkhead. By shortening the length of the blade 252, the blade can be swung as shown by the arrow 90 either clockwise or counterclockwise but does not have to travel a full circle. Therefore, the ground clearance necessary is not as great as in the case of the longer blade 152. If the space is available, then the blade 252 can simply be rotated completely around in a full circle. The blade 252 can be used with either the weed-engaging bar 118 shown in FIG. 3 or the weed-engaging bar 218 shown in FIG. 5 with equal functionality.

In the case of the blades 152 or 252, a conventional detent is provided to maintain the blade 152 or 252 in its horizontal position during the weed-engaging and removing portion of the cycle. Also, during transit of the weed removal apparatus from location to location, it is also desirable to have the blade detented to prevent accidental rotation of the blade.

In summary, therefore, a method of removing aquatic weeds is described and illustrated along with an apparatus for carrying out the method. A substantially horizontal weed-engaging bar is dragged through a weed bed and the weeds are permitted to wrap around the bar. The weeds are then pulled by the bar until the stalks either break or the root system is pulled from the lake bottom. A blade is carried coextensively with the weed-engaging bar so that the weeds wrap themselves about both the weed-engaging bar and the blade simultaneously. The blade is then activated to cut the loops of the weeds thereby permitting the weeds to fall free from the blade and be gathered up for disposal. The weed-engaging blade and bar assembly is preferably mounted on a boom which can be raised when in transit from one weed location to the next or lowered to the desired depth in order to engage the weed bed. The boom is in turn mounted upon a barge or other floating hull and a propulsion system is provided to move the hull fore and aft both to carry out the removal operation and to transport the removal means to various places in a given lake. Preferably, a drag bar is provided below the weed-engaging bar. The boom is set so that the drag bar actually moves through the top layer of silt on the lake bottom disrupting the root systems of the weeds sufficiently to make the weeds easier to pull out, root and all. While the illustrated embodiment shows a flat-bottomed barge with a paddle wheel arrangement for propulsion, other types of hulls and propulsion systems can be used. Further, the means of raising and lowering the boom can be any suitable means and is not necessarily restricted to the cable and pulley arrangement illustrated. It will be seen therefore by those of ordinary skill in the art and others that several changes can be made to the illustrated embodiments of the invention without departing from the scope of the invention. The invention therefore should be defined solely by reference to the appended claims.

The embodiments of the invention in which an exclusive property or privilege is claimed are defined as follows:

1. A method of removing aquatic plants growing from the bottom of a body of water comprising the steps of:
   (a) moving a first, substantially horizontally oriented, elongate bar through the plants beneath the surface of the water permitting the plant stalks to wrap around the bar;
   (b) continuing to move the bar and wrap the plant stalks thereby breaking the stalks of at least a first portion of the plants at a point between the bar and the plant roots and pulling the roots of at least a second portion of the plants out of the bottom;
   (c) moving the bar to a desired location and severing the plant stalks wrapped around said bar to free the plant stalks from the bar.

2. The method of claim 1 further including the step of dragging a second horizontally oriented bar along the bottom simultaneously with moving said first bar through the plant stalks, said second bar disturbing the bottom and disturbing the root systems of the plants to aid in their removal by said first bar.

3. The method of claim 2 wherein said first bar is positioned over the shore when the weeds are severed.

4. The method of claim 2 wherein said first bar is submerged when the weeds are severed.

5. An apparatus for removing aquatic plants growing from the bottom of a body of water, said apparatus including:
   (a) a floating hull means;
   (b) a propulsion system associated with said hull means to move said hull means through the water;
   (c) a boom means pivotally attached at a first end thereof to said hull means;
   (d) rigging means associated with said hull means and said boom means, said rigging means operable to raise and lower said boom means;
   (e) plant-engaging means mounted on a second end of said boom means and adapted to move beneath the water and engage the stalks of the plants to be removed, said plant-engaging means including a substantially horizontally oriented plant-engaging bar, a blade means attached to said boom in a first position adjacent said plant-engaging bar, and at least a portion of said blade means movable to a second position spaced from said plant-engaging bar, said blade means and said plant-engaging bar cooperating to sever any plants wrapped about said plant-engaging bar as said blade means moves between its first and second positions.

6. The apparatus of claim 5 wherein said blade means is a substantially planar blade having opposed sharpened edges, and further including blade-mounting means associated with said boom operable to move said blade means reciprocally upwardly and downwardly between said first and second positions, so as to cut said plants during both the upward and downward strokes.

7. The apparatus of claim 5 wherein said blade means is rotatably mounted on said plant-engaging means adjacent said plant-engaging bar.

8. The apparatus of claim 7 wherein said blade means rotates about its midpoint.

9. The apparatus of claim 7 wherein said blade means rotates about one end thereof.

10. The apparatus of claim 5, 6 or 7 further including a drag bar mounted horizontally below said plant-engaging bar and adapted to be dragged through the bottom as the plant-engaging bar moves beneath the water so as to loosen the root systems of said plants.

11. The apparatus of claim 5 further including a planar pusher means having holes formed therethrough removably mounted on said boom means for pushing said severed plants through the water.

12. The apparatus of claim 11 wherein said pusher means comprises a screen.

13. The apparatus of claim 12 wherein said plant-engaging means includes a pair of spaced hooks, said screen being mounted on said hooks.

14. The apparatus of claim 5 wherein said propulsion system includes:
a pair of paddle wheels rotatably mounted on said hull means;
at least one hydraulic motor drivingly coupled to said paddle wheels;
a diesel engine; and,
pump means powered by said diesel engine, said pump means coupled to said hydraulic motor to provide pressurized hydraulic fluid to said hydraulic motor.

* * * * *